US011295573B2

(12) United States Patent

Fong

(10) Patent No.: US 11,295,573 B2
(45) Date of Patent: *Apr. 5, 2022

(54) METHOD OF GAMING, A GAMING SYSTEM AND A GAME CONTROLLER

(71) Applicant: ARISTOCRAT TECHNOLOGIES AUSTRALIA PTY LIMITED, North Ryde (AU)

(72) Inventor: Colin Fong, Penshurst (AU)

(73) Assignee: ARISTOCRAT TECHNOLOGIES AUSTRALIA PTY LIMITED, North Ryde (AU)

( * ) Notice: Subject to any disclaimer, the term of this patent is extended or adjusted under 35 U.S.C. 154(b) by 24 days.

This patent is subject to a terminal disclaimer.

(21) Appl. No.: 16/393,580

(22) Filed: Apr. 24, 2019

(65) Prior Publication Data

US 2019/0251780 A1 Aug. 15, 2019

Related U.S. Application Data

(63) Continuation of application No. 15/232,541, filed on Aug. 9, 2016, now Pat. No. 10,297,104.

(30) Foreign Application Priority Data

Aug. 10, 2015 (AU) ................................ 2015903195

(51) Int. Cl.

| | |
|---|---|
| ***A63F 9/24*** | (2006.01) |
| ***A63F 13/00*** | (2014.01) |

(Continued)

(52) U.S. Cl.

CPC ...... *G07F 17/3213* (2013.01); *G07F 17/3209* (2013.01); *G07F 17/3225* (2013.01);

(Continued)

(58) Field of Classification Search

CPC ...... G07F 17/32; G07F 17/34; G07F 17/3213; G07F 17/3211

See application file for complete search history.

(56) References Cited

U.S. PATENT DOCUMENTS 7,252,591 B2 8/2007 Van Asdale et al.
8,096,877 B2 1/2012 Hoffman (Continued)

*Primary Examiner* — Milap Shah
*Assistant Examiner* — Jason Pinheiro
(74) *Attorney, Agent, or Firm* — Armstrong Teasdale LLP

(57) ABSTRACT

A method of dynamically forming a dynamic reel strip to be used to generate a game outcome in an electronic gaming system. The method includes defining a dynamic reel strip. A plurality of reel strip positions of each reel includes a group of dynamically determined symbol positions, and fixed symbol positions. The method includes initiating a play of the game then updating each dynamic reel strip by selecting, at random, a fixed symbol position from a subset of the fixed symbol positions of the respective reel strip. The method further includes determining a symbol of the set of game symbols to occupy each dynamically determined symbol position of the group of dynamically determined symbol positions based on the selected fixed symbol position of the respective reel strip. Displaying, via a game controller, symbols in symbol display positions on a display of the gaming system.

20 Claims, 6 Drawing Sheets

(51) Int. Cl.
*G07F 17/00* (2006.01)
*G07F 17/32* (2006.01)
*G07F 17/34* (2006.01)

(52) U.S. Cl.
CPC ...... *G07F 17/3246* (2013.01); *G07F 17/3251* (2013.01); *G07F 17/34* (2013.01)

(56) References Cited

U.S. PATENT DOCUMENTS

| | | | | |
|---|---|---|---|---|
| 8,574,059 | B2 | 11/2013 | Rodgers et al. | |
| 8,986,102 | B2 | 3/2015 | Vandaele | |
| 2006/0058097 | A1 | 3/2006 | Berman et al. | |
| 2008/0064487 | A1 | 3/2008 | Stevens et al. | |
| 2008/0102928 | A1 | 5/2008 | Daley | |
| 2009/0124347 | A1 | 5/2009 | Rodgers et al. | |
| 2009/0197667 | A1 | 8/2009 | Kim | |
| 2010/0016061 | A1 | 1/2010 | Gomez et al. | |
| 2010/0234092 | A1 | 9/2010 | Gomez et al. | |
| 2011/0151961 | A1 | 6/2011 | Stevens et al. | |
| 2012/0083327 | A1 | 4/2012 | Zobel et al. | |
| 2013/0260863 | A1 | 10/2013 | Lee et al. | |
| 2014/0057698 | A1 | 2/2014 | Rodgers et al. | |
| 2014/0066174 | A1 | 3/2014 | Rodgers et al. | |
| 2014/0087822 | A1 | 3/2014 | Watkins | |
| 2014/0179402 | A1 | 6/2014 | Delekta et al. | |
| 2014/0221079 | A1* | 8/2014 | Rucker ............... | G07F 17/3267 463/21 |
| 2014/0274294 | A1 | 9/2014 | Baerlocher et al. | |
| 2015/0105133 | A1* | 4/2015 | Anderson ........... | G07F 17/3209 463/17 |
| 2016/0379439 | A1 | 12/2016 | Galasso et al. | |

* cited by examiner

METHOD OF GAMING, A GAMING SYSTEM AND A GAME CONTROLLER

CROSS-REFERENCE TO RELATED APPLICATIONS

This application is a continuation of U.S. patent application Ser. No. 15/232,541, filed Aug. 9, 2016, which claims the benefit of priority to Australian Provisional Patent Application No. 2015903195, filed Aug. 10, 2015, the entire contents and disclosure of which are hereby incorporated by reference in their entirety.

BACKGROUND

The present invention relates to a method of gaming, a gaming system and a game controller.

Gaming machines with reel strips that include "stacks" of symbols (i.e. multiple instances of the same symbol at consecutive reel strip positions) are known. In current gaming machines, the symbols that make up the stack are fixed.

A need exists for alternative gaming systems.

BRIEF DESCRIPTION

In one aspect, a method of dynamically forming at least one dynamic reel strip of a plurality of reel strips to be used to generate a game outcome in an electronic gaming system is provided. The method is implemented using a gaming system. The gaming system includes a display configured to display a wagering game, a player input interface, a credit input mechanism and a game controller. The credit input mechanism includes at least one of a card reader, a ticket reader, a bill acceptor, and a coin input mechanism, and is configured to establish a credit balance that is increasable and decreasable based on wagering activity. The method comprising defining storing in a memory of the gaming system at least one dynamic reel strip comprising a plurality of reel strip positions, the plurality of reel strip positions of each at least one reel comprising a group of dynamically determined symbol positions, and fixed symbol positions each fixedly associated with a symbol of a set of game symbols, wherein the group of dynamically determined symbol positions comprises at least two consecutive reel strip positions; and initiating a play of the game. The method including the game controller updating, via game controller, each dynamic reel strip defined in the memory by selecting, at random, a fixed symbol position from at least one subset of the fixed symbol positions of the respective reel strip, and determining a symbol of the set of game symbols to occupy each dynamically determined symbol position of the group of dynamically determined symbol positions based on the selected fixed symbol position of the respective reel strip. The method including displaying, via a game controller, symbols in symbol display positions on a display of the gaming system.

In another aspect, an electronic gaming system for dynamically forming at least one dynamic reel strip of a plurality of reel strips to be used to generate a game outcome in the electronic gaming system is provided. The electronic gaming system comprising a display configured to display a wagering game, a player input interface, a credit input mechanism including at least one of a card reader, a ticket reader, a bill acceptor, and a coin input mechanism. The credit input mechanism configured to receive a credit wager to initiate play of a base game, and establish a credit balance that is increasable and decreasable based on wagering activity and a random number generator. The electronic gaming system including a memory of the gaming system in which is defined at least one dynamic reel strip comprising a plurality of reel strip positions, the plurality of reel strip positions of each at least one reel comprising a group of dynamically determined symbol positions, and fixed symbol positions each fixedly associated with a symbol of a set of game symbols, wherein the group of dynamically determined symbol positions comprises at least two consecutive reel strip positions and a reel strip updater, configured to subsequent to initiation of a play of the game the reel strip updater updating each dynamic reel strip defined in the memory by selecting at random a fixed symbol position from at least a subset of the fixed symbol positions of the respective reel strip using the random number generator, and determining a symbol of the set of game symbols to occupy each dynamically determined symbol position of the group of dynamically determined symbol positions based on the selected fixed symbol position of the respective reel strip.

In yet another aspect, an electronic game controller for an electronic gaming system is provided. The gaming system including a display configured to display a wagering game, a player input interface, and a credit input mechanism including at least one of a card reader, a ticket reader, a bill acceptor, and a coin input mechanism, the credit input mechanism configured to establish a credit balance that is increasable and decreasable based on wagering activity, a processor configured to receive an indication of a credit wager input to the credit input mechanism to initiate play of a base game. The electronic game controller configured to access a memory of the gaming system that defines at least one dynamic reel strip comprising a plurality of reel strip positions, the plurality of reel strip positions of each at least one reel comprising a group of dynamically determined symbol positions, and fixed symbol positions each fixedly associated with a symbol of a set of game symbols, wherein the group of dynamically determined symbol positions comprises at least two consecutive reel strip positions; and initiation a play of the game update each dynamic reel strip defined in the memory by selecting at random a fixed symbol position from at least a subset of the fixed symbol positions of the respective reel strip, and determining a symbol of the set of game symbols to occupy each dynamically determined symbol position of the group of dynamically determined symbol positions based on the selected fixed symbol position of the respective reel strip; and displaying a selection of symbols in symbol display positions on a display of the gaming system.

BRIEF DESCRIPTION OF THE DRAWINGS

An exemplary embodiment of the invention will now be described with reference to the accompanying drawings in which.

DETAILED DESCRIPTION

Figure 1:
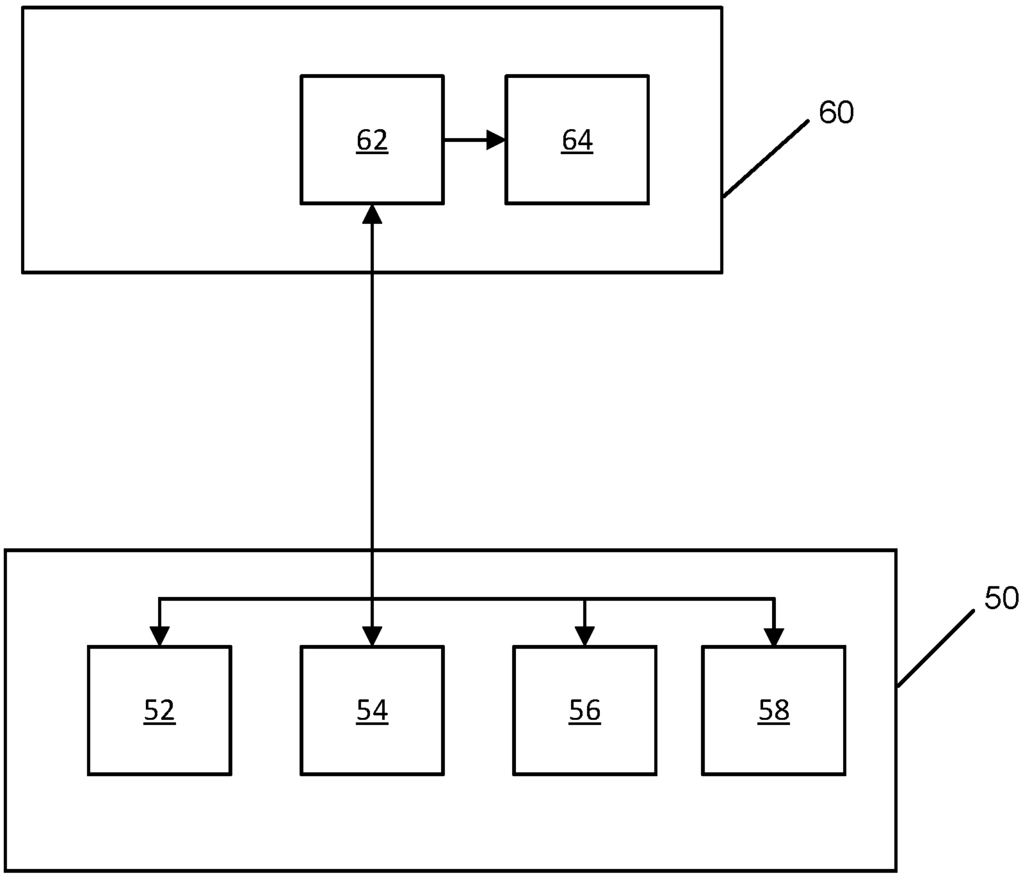
FIG. 1 is a block diagram of exemplary core components of a gaming system.

Referring to the drawings, there is shown a gaming system including a game controller. The game controller includes components that enable the implementation of a game where at least some of the reel strips can be updated dynamically during each play of the game such that stacked symbols within the game vary from game to game. In one embodiment, this is implemented by the game controller randomly selecting a reel strip position from among a subset of reel strip positions that have symbols fixedly associated with them. The symbol that is used to populate the stack of symbols is derived from the selected reel strip position as explained in further detail below.

General Construction of an Exemplary Gaming System

The gaming system can take a number of different forms. In a first aspect, a standalone gaming machine is provided wherein all or most components required for implementing the game are present in a player operable gaming machine.

In a second aspect, a distributed architecture is provided wherein at least some of the components required for implementing the game are present in a player operable gaming machine and at least some of the components required for implementing the game are located remotely relative to the gaming machine. For example, a "thick client" architecture may be used wherein part of the game is executed on a player operable gaming machine and part of the game is executed remotely, such as by a gaming server Alternatively, a "thin client" architecture may be used wherein most of the game is executed remotely from the gaming machine such as by a gaming server and a player operable gaming machine is used only to display audible and/or visible gaming information to the player and receive gaming inputs from the player.

However, it will be understood that other arrangements are envisaged. For example, an architecture may be provided wherein a gaming machine is networked to a gaming server and the respective functions of the gaming machine and the gaming server are selectively modifiable. For example, the gaming system may operate in standalone gaming machine mode, "thick client" mode or "thin client" mode depending on the game being played, operating conditions, and so on. Other variations will be apparent to persons skilled in the art.

FIG. 1 is a block diagram of exemplary core components of a gaming system #. Irrespective of the form, gaming system # has several core components. At the broadest level, exemplary core components are a player interface 50 and a game controller 60. Player interface 50 is arranged to enable manual interaction between a player and gaming system # as such for this purpose includes the input/output components required for the player to enter instructions to play the game and observe the game outcomes.

Components of player interface 50 may vary from embodiment to embodiment but will typically include at least credit mechanism 52 to enable a player to input credits and receive payouts, at least one display 54, a game play mechanism 56 including one or more input devices that enable a player to input game play instructions (e.g. to place a wager), and at least one speaker 58.

Game controller 60 is in data communication with the player interface 50 and typically includes a processor 62 that processes the game play instructions in accordance with game play rules and outputs game play outcomes to the display. Typically, the game play rules are stored as program code in a memory 64 but can also be hardwired. As used herein, the term "processor" refers generically to any device that can process game play instructions in accordance with game play rules and may include for example, a microprocessor, microcontroller, programmable logic device or other computational device, a general purpose computer (e.g. a PC) or a server. That is, a processor 62 may be provided by any suitable logic circuitry for receiving inputs, processing them in accordance with instructions stored in memory 64 and generating outputs (for example on display 54). Such processors are sometimes also referred to as central processing units (CPUs). Most processors are general purpose units, however, it is also know to provide a specific purpose processor using an application specific integrated circuit (ASIC) or a field programmable gate array (FPGA).

Figure 2:
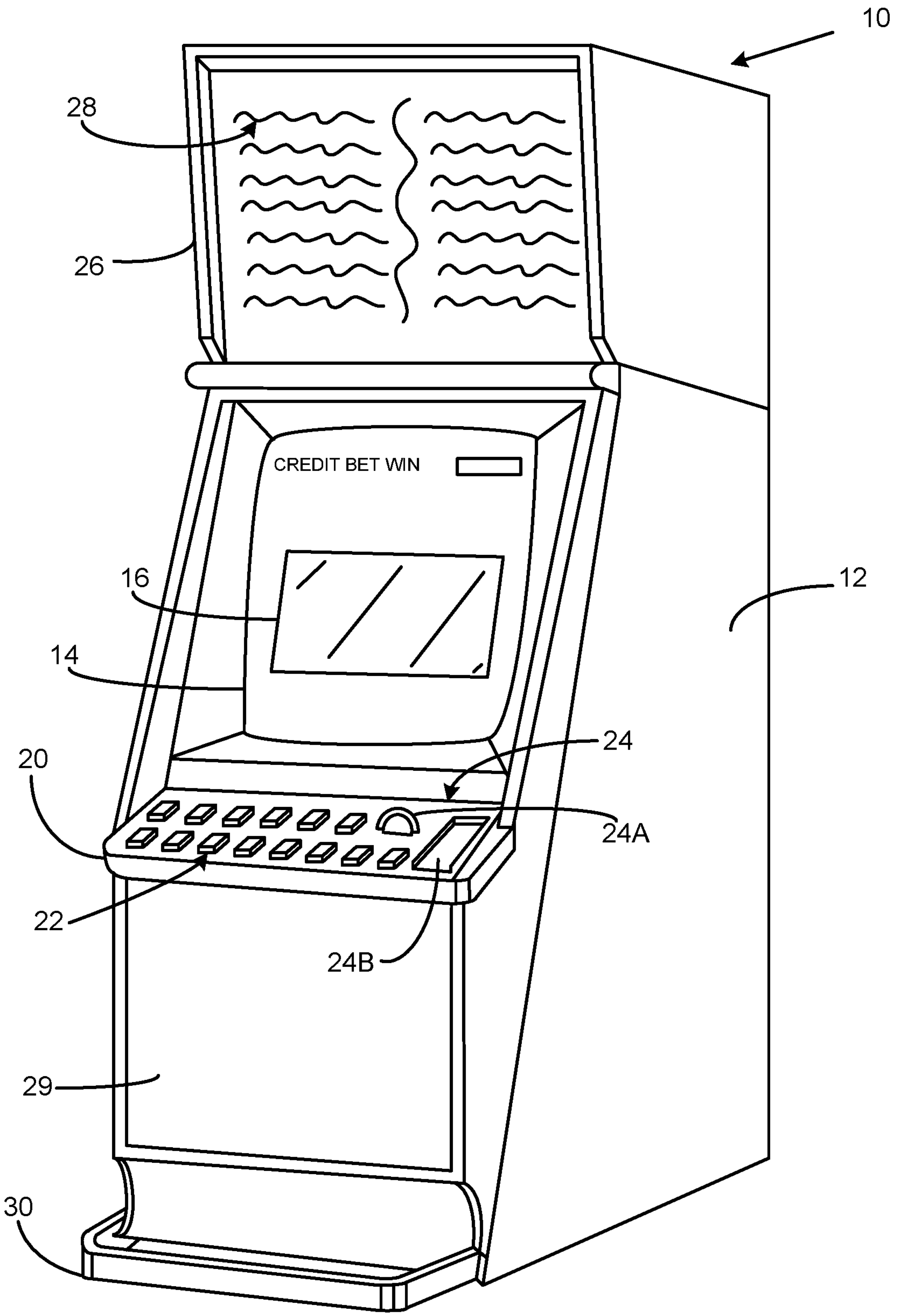
FIG. 2 is a perspective view of an exemplary standalone gaming machine.

FIG. 2 illustrates a gaming system # in the form of an exemplary standalone gaming machine 10. In the exemplary embodiment, gaming machine 10 includes a console 12 having a display 14 on which are displayed representations of a game 16 that can be played by a player. A mid-trim 20 of gaming machine 10 houses a bank of buttons 22 for enabling a player to interact with the gaming machine, in particular during game play. Mid-trim 20 also houses a credit input mechanism 24. In the exemplary embodiment, card input mechanism 24 includes a coin input chute 24A and a bill collector 24B. Other credit input mechanisms may also be employed, such as, for example, a card reader for reading a smart card, debit card or credit card. Other gaming machines may be configure for ticket in such that they have a ticket reader for reading tickets having a value and for crediting the player based on the face value of the ticker. A player marketing module (not shown) having a reading device may also be provided for the purpose of reading a player tracking device, for example as part of a loyalty program. The player tracking device may be in the form of a card, flash drive or any other portable storage medium capable of being read by the reading device. In some embodiments, the player marketing module may provide an additional credit mechanism, either by transferring credits to the gaming machine from credits stored on the player tracking device or by transferring credits from a player account in data communication with the player marketing module that is accessed in response to insertion of the player tracking device.

A top box 26 may carry artwork 28, including for example pay tables and details of bonus awards and other information or images relating to the game. Further artwork and/or information may be provided on a front panel 29 of the console 12. In the exemplary embodiment, a payout mechanism such as a coin tray 30 is mounted beneath the front panel 29 for dispensing cash payouts from the gaming machine 10.

In the exemplary embodiment, display 14 is a liquid crystal display. Alternatively, display 14 may be any other suitable video display unit, such as an OLED display. Top box 26 may also include a display, which may be of the same type as display 14, or of a different type.

Figure 3:
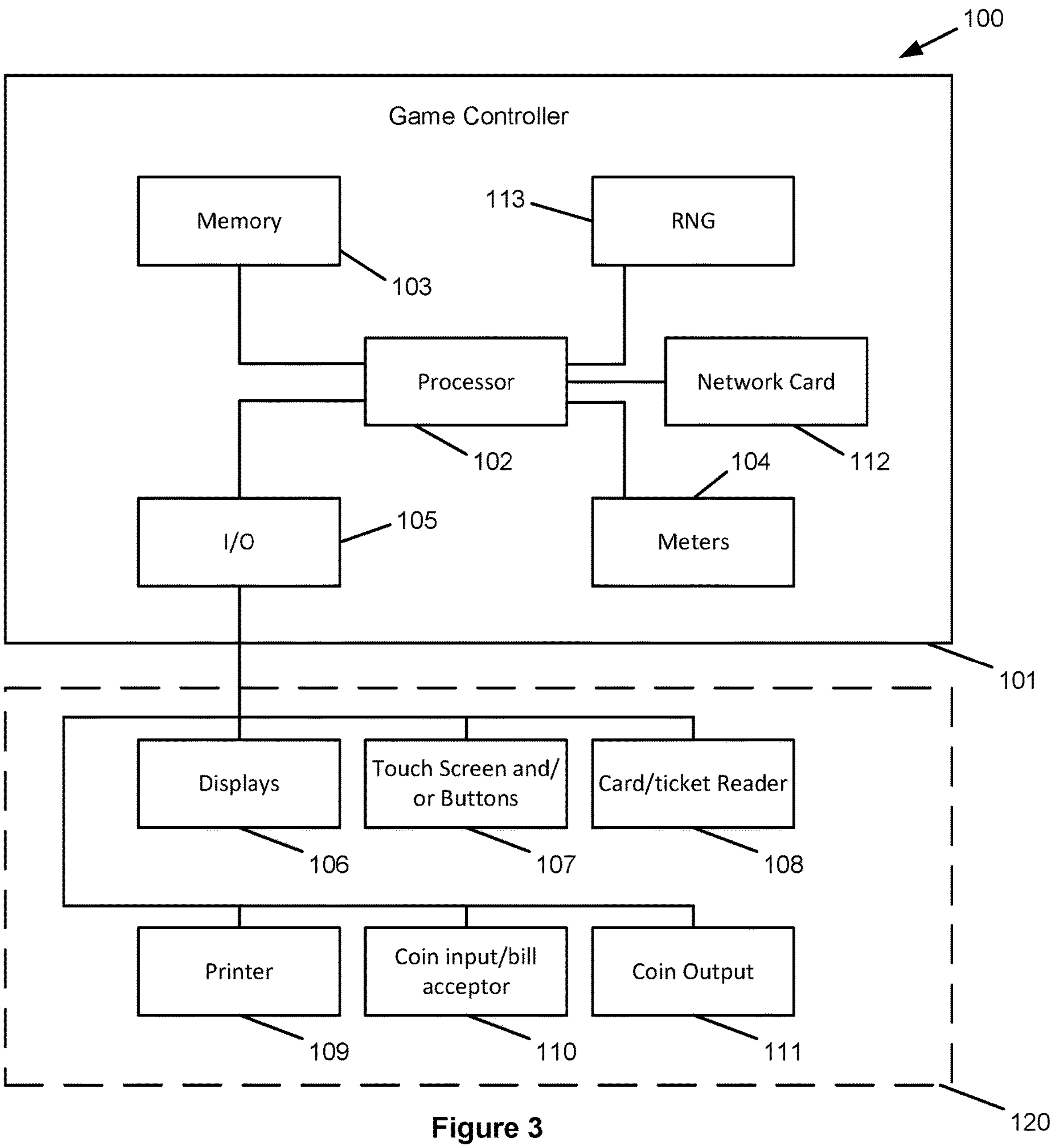
FIG. 3 is a block diagram of exemplary functional components of a gaming machine.

FIG. 3 illustrates a block diagram of exemplary functional components of a typical gaming machine 100 that may be the same as or different to the gaming machine 10 of FIG. 2.

Gaming machine 100 includes a game controller 101 having a processor 102 mounted on a circuit board. Instructions and data to control operation of processor 102 are stored in a memory 103, that is in data communication with processor 102. Typically, gaming machine 100 will include both volatile and non-volatile memory and more than one of each type of memory, with such memories being collectively represented by the memory 103.

Gaming machine 100 includes hardware meters 104 for purposes including ensuring regulatory compliance and monitoring player credit, an input/output (I/O) interface 105 for communicating with peripheral devices of the gaming machine 100. Input/output interface 105 and/or the peripheral devices may be intelligent devices with their own memory for storing associated instructions and data for use with input/output interface 105 or the peripheral devices. A random number generator module 113 generates random numbers for use by the processor 102. Persons skilled in the art will appreciate that the reference to random numbers includes pseudo-random numbers.

In the exemplary embodiment, a player interface 120 includes peripheral devices that communicate with the game controller 101 including one or more displays 106, a touch screen and/or input buttons 107 (that provide a game play mechanism),and a credit input mechanism such as a card and/or ticket reader 108, a bill acceptor 110 and/or coin input mechanism 110 The credit input mechanism is configured to receive a credit wager to initiate play of a base game, and establish a credit balance (e.g., using the received credit wager) that is increasable and decreasable based on wagering activity within a game. Player interface 120 also includes a payout mechanism such as a printer 109 and/or a coin output mechanism 111. The payout mechanism is configured to output a payout to a player of gaming machine 100 based on an outcome of the game (e.g., a base game and/or a feature game). Additional hardware may be included as part of gaming machine 100, or hardware may be omitted as required for the specific implementation. For example, although buttons or touch screens are typically used in gaming machines to allow a player to place a wager and initiate a play of a game any input device that enables the player to input game play instructions may be used. For example, in some gaming machines a mechanical handle may be used to initiate a play of the game. Persons skilled in the art will also appreciate that a touch screen can be used to emulate other input devices, such as, for example, a touch screen can display virtual buttons that a player can "press" by touching the screen where they are displayed.

In addition, gaming machine 100 may include a communications interface, for example a network card 112. Network card 112 may, for example, send status information, accounting information or other information to a bonus controller, central controller, server or database and receive data or commands from the bonus controller, central controller, server or database. In embodiments employing a player marketing module, communications over a network may be via player marketing module—i.e. the player marketing module may be in data communication with one or more of the above devices and communicate with it on behalf of the gaming machine.

Figure 4:
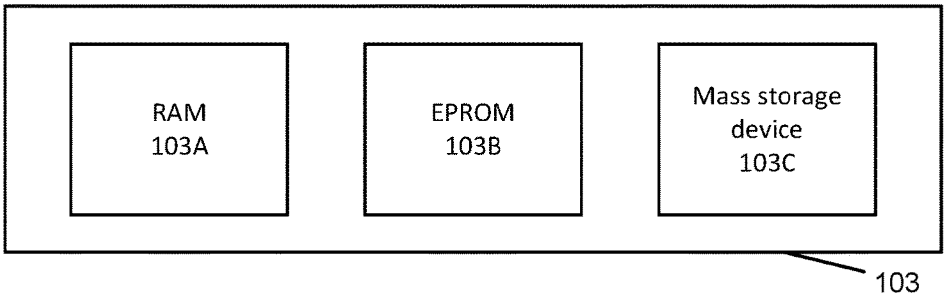
FIG. 4 is a schematic diagram of exemplary functional components of a memory.

FIG. 4 is a block diagram of the main components # of a memory 103. In the exemplary embodiment, memory 103 includes RAM 103A, EPROM 103B and a mass storage device 103C. RAM 103A typically temporarily holds program files for execution by processor 102 and related data. EPROM 103B may be a boot ROM device and/or may contain some system or game related code. Mass storage device 103C is typically used to store game programs, the integrity of that may be verified and/or authenticated by processor 102 using protected code from EPROM 103B or elsewhere.

It is also possible for the operative components of gaming machine 100 to be distributed, for example input/output devices 106, 107, 108, 109, 110, 111 to be provided remotely from the game controller 101.

Figure 5:
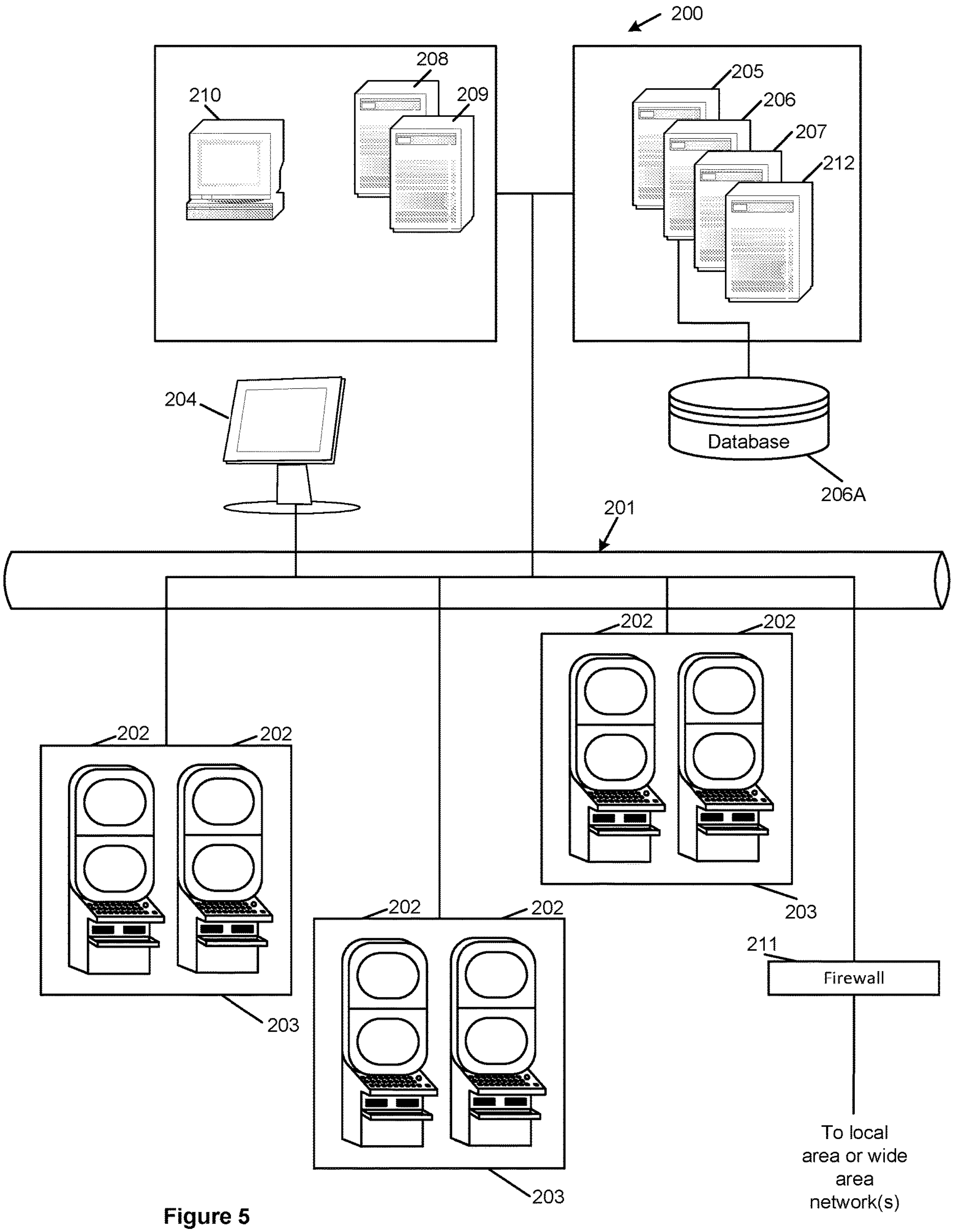
FIG. 5 is a schematic diagram of an exemplary network gaming system.

FIG. 5 illustrates an exemplary embodiment of a gaming system 200. Gaming system 200 includes a network 201, for example, may be an Ethernet network. In exemplary gaming machines 202, shown arranged in three banks 203 of two gaming machines 202 in, are coupled to network 201. Gaming machines 202 provide a player operable interface and may be the same as gaming machines 10 and/or 100 (shown respectively in FIGS. 2 and 3), or may have simplified functionality depending on the requirements for implementing game play. Although, banks 203 of two gaming machines shown in the exemplary embodiment, banks of one, three or more gaming machines 100 are also envisioned.

One or more displays 204 may also be coupled to the network 201. For example, displays 204 may be associated with one or more banks 203 of gaming machines 100. Displays 204 may be used to display representations associated with game play on gaming machines 202, and/or used to display other representations, for example promotional or informational material.

In a thick client embodiment, a game server 205 implements part of the game played by a player using a gaming machine 202 and gaming machine 202 implements part of the game. With this embodiment, as both the game server and the gaming device implement part of the game, they collectively provide a game controller. A database management server 206 may manage storage of game programs and associated data for downloading or access by the gaming machines 202 in a database 206A. Typically, if the gaming system 200 enables players to participate in a Jackpot game, a Jackpot server 207 will be provided to perform accounting functions for the Jackpot game. A loyalty program server 212 may also be provided.

In a thin client embodiment, game server 205 implements most or all of the game played by a player using a gaming machine 202 and the gaming machine 202 essentially provides only the player interface. In such embodiment, game server 205 provides the game controller. Gaming machine 202 receives player instructions, and transmit these instructions to game server 205. Game server 205 processes the player instructions and returns game play outcomes to gaming machine 202 for display. In a thin client embodiment, gaming machines 202 could be computer terminals, e.g., PCs running software that provides a player interface operable using standard computer input and output components. Other client/server configurations are possible, and further details of a client/server architecture can be found in WO 2006/052213 and PCT/SE2006/000559, the disclosures of which are incorporated herein by reference.

Servers are also typically provided to assist in the administration of gaming system 200, including for example a gaming floor management server 208, and a licensing server 209 to monitor the use of licenses relating to particular games. An administrator terminal 210 is provided to allow an administrator to run the network 201 and the devices connected to network 201.

Gaming system 200 may communicate with other gaming systems, other local networks, (for example a corporate network) and/or a wide area network such as the Internet, for example through a firewall 211.

Persons skilled in the art will appreciate that in accordance with known techniques, functionality at the server side of network 201 may be distributed over a plurality of different computers. For example, elements may be run as a single "engine" on one server or a separate server may be provided. For example, the game server 205 could run a random generator engine. Alternatively, a separate random number generator server could be provided. Further, persons skilled in the art will appreciate that a plurality of game servers could be provided to run different games or a single game server may run a plurality of different games as required by the terminals.

Further Detail of the Exemplary Gaming System

In one embodiment, the player operates the game play mechanism 56 to specify a wager that will be evaluated for this play of the game and initiates a play of the game. Persons skilled in the art will appreciate that a player's wager can be varied from game to game dependent on player selections. In most spinning reel games, it is typical for the player's wager to be made up of a selection as to how the game outcome will be evaluated by specifying what parts of the game outcome will qualify for winning outcomes and a multiplier that will apply to each winning outcome. For example, a player's wager may be based on how many lines they play in each game—e.g. a minimum of one line up to the maximum number of lines allowed by the game (noting that not all permutations of win lines may be available for selection) and an amount per line—e.g. one, two or five credits. Winning outcomes on an activated win line may be evaluated based on a pay table that specifies the amount awarded for a one credit per line wager multiplied by the amount wagered per line.

Such win lines are typically formed by a combination of symbol display positions, one from each reel, the symbol display positions being located relative to one another such that they form a line.

In many games, the gaming machine may award winning outcomes that may not be strictly limited to the lines they have selected. For example, "scatter" pays may be awarded independently of a players selection of pay lines.

Persons skilled in the art, will appreciate that in other embodiments, the player may select a number of reels to play and an amount to wager per reel. Games of this type may be marketed under the trade name "Reel Power" by Aristocrat Leisure Industries Pty Ltd and are also known as "ways" to win games. The selection of the reel means that each displayed symbol of a reel can be substituted for a symbol at one or more designated display positions. In other words, all symbols displayed at symbol display positions corresponding to a selected reel can be used to form symbol combinations with symbols displayed at a designated, symbol display positions of the other reels. For example, if there are five reels and three symbol display positions for each reel such that the symbol display positions comprise three rows of five symbol display positions, the symbols displayed in the center row may be used for non-selected reels. As a result, the total number of ways to win is determined by multiplying the number of active display positions of each reels, the active display positions being all display positions of each selected reel and the designated display position of the non-selected reels. As a result for five reels and fifteen display positions there are 243 possible ways to win.

In the embodiment described above, the display positions of the symbol display may be arranged in a rectangular matrix comprising a plurality of columns and a plurality of rows. However, other arrangements are known in the gaming industry and could be employed in embodiments of the invention. For example, in some arrangements there are more symbols in some columns than others, such as 3-4-3-4-3 arrangement of seventeen display positions corresponding to respective ones of five reels. In such arrangements, the columns of four symbols can be arranged so that they are off-set or staggered relative to the columns having three symbols so that the middle two symbols in the columns of four symbols share boundaries with two symbols of each neighboring reel.

Figure 6:
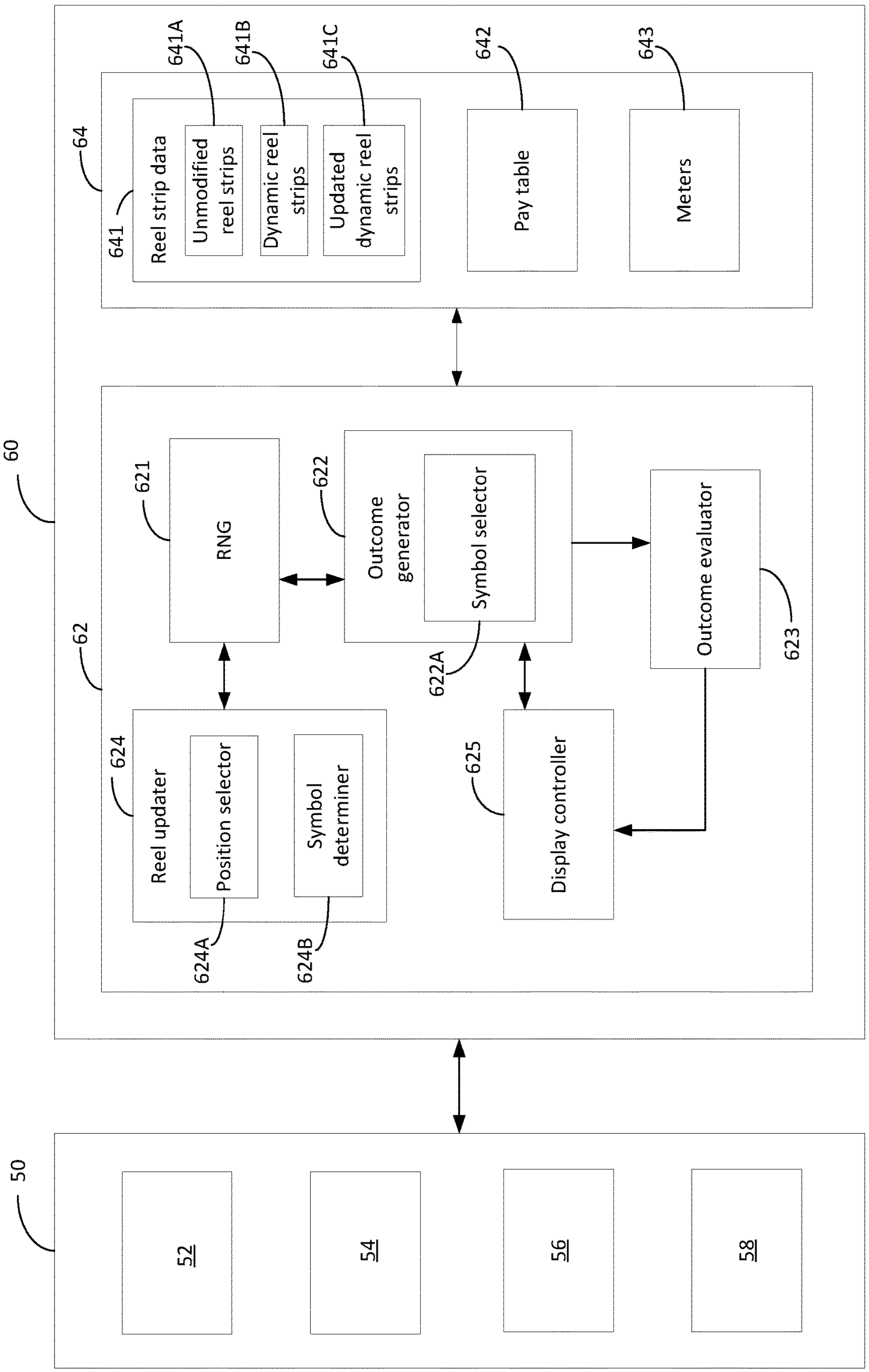
FIG. 6 is a further block diagram of an exemplary gaming system.

FIG. 6 illustrates another block diagram of an exemplary gaming system. In the exemplary embodiment processor 62 of game controller 60 is shown implementing a number of modules based on program code and data stored in memory 64. Persons skilled in the art will appreciate that various of the modules could be implemented in some other way, for example by a dedicated circuit.

Shown is an example embodiment where the components of the gaming machine are used to update the reel strips in a base game. Memory 64 of gaming system 1 includes reel strip data 641 that defines a number of reel strips. In one embodiment, the reel strips comprise a mixture of unmodified reel strips 641A and dynamic reel strips 641B. In the example embodiment, the unmodified reel strips are used in a defined form whereas the dynamic reel strips 641B are updated in each play of the base game. In one example, there are five reel strips, three are unmodified reel strips and two are dynamic reel strips. In another example, there are five reel strips, four are unmodified reel strips and one is a dynamic reel strip.

Each dynamic reel strip 641B has a number of fixed symbol positions include a symbol of the set of game symbols fixedly associated with their position. That is, that symbol will always occupy the relevant position of the reel strip. Each dynamic reel strip also includes a number of dynamic symbol positions that the symbol that will occupy the dynamic reel strip positions is determined dynamically during each play of the base game. These dynamic reel strip positions can be thought of as mystery symbol positions. In the example embodiments, the dynamic symbol positions are arranged in groups of at least two consecutive symbols on the reel strips to provide a stack of symbols that will be the same once the symbol is selected. Typically, the stack will be longer than two symbols, for example, three, four, five, six, seven or eight symbols long. In the examples below, there is one group (or stack of symbols) in the reel strip but in other embodiments, there could be multiple groups of dynamic reel strip positions.

In order to implement the functionality, the game controller 60 includes a component in the form of a reel updater 624 that updates dynamic reel strip 641B to form a update of reel strips 641C. The reel updater 624 has a position selector 624A that, in one embodiment, uses RNG 621 to randomly select a fixed symbol position from at least a subset of fixed symbol positions of the respective reel strip which is to be updated. In one embodiment, each fixed symbol position has an equal probability of being selected. In another example, the positions may be weighted. In another example, only a subset of the fixed symbol positions may be used as the basis of the selection.

Reel updater 624 also has a symbol determiner 624B which determines the identity of the symbol to be used to update the group of dynamically determined symbol positions of dynamic reel strip 641B based on the identity of the selected fixed symbol position.

In one embodiment, symbol determiner 624B directly determines the identity of the symbol from the identity of the symbol that is located at the selected fixed position. And that symbol is then used to populate the dynamically determined symbol positions of the dynamic reel strips from the updated reel strip 641C. In another embodiment, when the selected fixed symbol position is one of a first subset of fixed symbol positions, symbol determiner 624B is configured such that the symbol that is determined by the symbol determiner 624B is the symbol associated with the selected fixed symbol position whereas if the selected fixed symbol position is one of a second subset of fixed symbol positions, the symbol that is determined is a default symbol.

In one embodiment, the default symbol is not associated with any of the fixed symbol positions and hence only occurs in the symbol set (and hence in game outcomes generated using the updated dynamic reel strip) when one of the second subset of fixed symbol positions is selected. In another embodiment, after a fixed symbol position is determined, a second random determination is carried out to determine whether the symbol at that fixed symbol position will be used or whether the default symbol will be used. In one embodiment, weightings are associated with at least a subset of the fixed symbol positions. The associated weighting sets the probability that the symbol determiner 624B will determine using random number generator 621 that that symbol may be selected and used to populate the dynamically determined symbol position. For example, a weighting of 0.2 will mean that there is a 20% chance that the symbol determiner 624 will populate the dynamically determined symbol position.

After a symbol is chosen, the dynamic reel strip or reel strips are updated by reel updater 624 with the selected symbols and stored as updated reel strips 641C to in memory 64. In other embodiments, symbols may be selected separately for each reel strip. In other embodiments, whether there are multiple groups of fixed symbols, the process may be repeated separately for each group.

After the dynamic reel strips have been updated, symbol selector 622A to select symbols from a set of symbols specified by symbol data 641 using random number generator 621. The selected symbols are advised to the display controller 624 which causes them to be displayed on display 54 at a set of symbol display positions.

In the embodiment, the symbol selector 622A to selects symbols for display at symbol display positions from the unmodified reel strips 641A and updated reel strips 641C corresponding to respective ones of a plurality of spinning reels. As will be appreciated from the discussion, the unmodified reel strips 641A and updated dynamic reel strips 641C specify a sequence of symbols for each reel. In an embodiment, the symbol selector 622A selects the symbols for display by selecting a stopping position in the sequence. In one example, three symbols of each of five reels are displayed such that symbols are displayed at fifteen symbol display positions on display 54. It is known to use a probability table stored in memory 64 to vary the odds of a particular stop position being selected. Other techniques can be used to control the odds of particular outcomes occurring to thereby control the return to player of the game.

Once the symbols are selected, they may evaluated by outcome evaluator 623 by comparing the symbol selected at symbol display positions on display 54 with pay table 643. Both the selected symbols and any winning outcomes are displayed on display 54 under control of display controller 625. Any wins are added to a win meter of meters 643 stored in memory 64. Assuming this ends that game, e.g. a feature is not triggered or the player does not chose a gamble feature, the value on the win meter can be transferred to the credit meter either by the player initiating a new play of the game or electing to cash out. In some embodiments, certain win types (e.g. jackpot prize wins) may be added directly to the credit meter.

In some embodiments, an eligibility criteria may be applied in order for the player to be eligible for the dynamic reel strips, for example that the player has made a certain sized wager, made an ante bet, selected all win lines, played sufficient games, or the player is a member of a loyalty program.

The dynamic reel strips may be employed in a base game or a feature game. The base game is a part of the game that is carried out each time the player makes a wager, typically irrespective of the wager, whereas the feature game will usually only be carried out occasionally in a play of the game. For example if a condition is met such as a trigger occurring.

The trigger event may be, a symbol combination in the game, occurrence of a specific symbol in the game, purchased, be caused by another connected system, based on turnover, based on a random evaluation, etc.

A play of a game may result in one or more wins. Typically, a win will result in some form of award being made such as an award of credits added to the win meter. Such an award may never actually be physically received by a player. For example, many gaming systems provide a player with a double or nothing gamble feature, where the player can double or forfeit their credits before commencing another play of the game or cashing out. Further, as credits are fungible, once credits have been added to the credit meter it is not possible to distinguish between credits which exist because the player has input cash or the like and credits resulting from an award.

Figure 7:
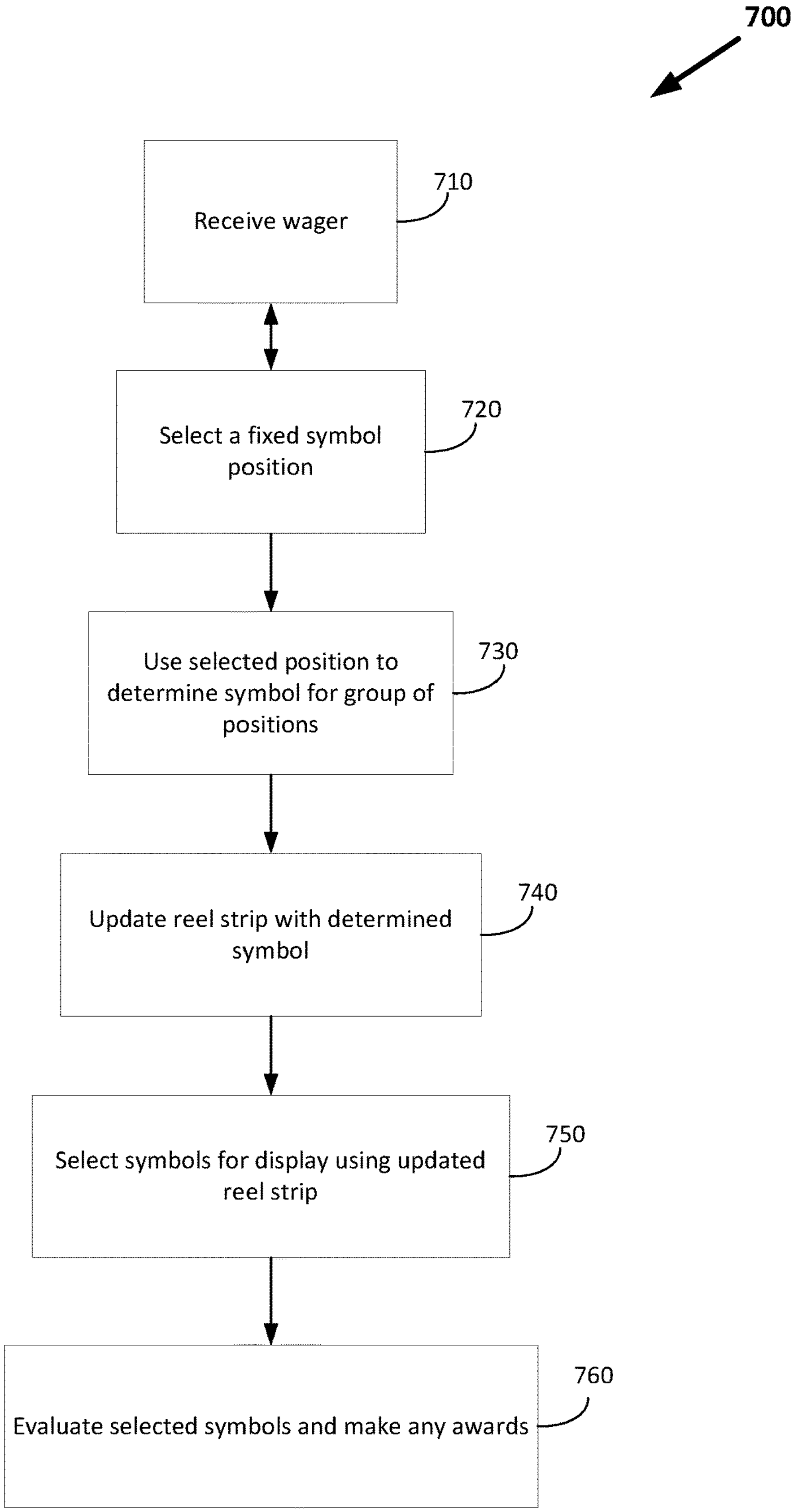
FIG. 7 is a flow chart of an exemplary method of electronic gaming.

FIG. 7 is a flow chart of one exemplary method 700. The exemplary method 700 includes defining in a memory of the gaming system at least one dynamic reel strip comprising a plurality of reel strip positions, the plurality of reel strip positions of each at least one reel comprising a group of dynamically determined symbol positions, and fixed symbol positions each fixedly associated with a symbol of a set of game symbols, wherein the group of dynamically determined symbol positions comprises at least two consecutive reel strip positions; The method further includes initiating a play of the game. The method also includes updating, via game controller, each dynamic reel strip defined in the memory by selecting, at random, a fixed symbol position from at least one subset of the fixed symbol positions of the respective reel strip, and determining a symbol of the set of game symbols to occupy each dynamically determined symbol position of the group of dynamically determined symbol positions based on the selected fixed symbol position of the respective reel strip. The method further includes displaying, via a game controller, symbols in symbol display positions on a display of the gaming system.

In a second form, a distributed architecture is provided wherein at least some of the components required for implementing the game are present in a player operable gaming machine and at least some of the components required for implementing the game are located remotely from the gaming machine. For example, a "thick client" architecture may be used wherein part of the game is executed on a player operable gaming machine and part of the game is executed remotely, such as by a gaming server. Alternatively, a "thin client" architecture may be used wherein most of the game is executed remotely from the gaming machine, such as by a gaming server and a player operable gaming machine is used only to display audible and/or visible gaming information to the player and receive gaming inputs from the player.

However, it will be understood that other arrangements are envisaged. For example, an architecture may be provided wherein a gaming machine is networked to a gaming server and the respective functions of the gaming machine and the gaming server are selectively modifiable. For example, the gaming system may selectively operate in standalone gaming machine mode, “thick client” mode or “thin client” mode depending on several factors, including, for example, the game being played, operating conditions, and/or other factors. Other variations will be apparent to persons skilled in the art.

FIG. 1 is a block diagram of exemplary core components 80 of a gaming system 75. Irrespective of the form, gaming system 75 includes several core components 80. At the broadest level, exemplary core components 80 are a player interface 50 and a game controller 60. Player interface 50 is arranged to enable manual interaction between a player and gaming system 75 and, as such, includes input/output components 52, 54, 56, 58 required for the player to enter instructions to play the game and observe the game outcomes.

Components of player interface 50 may vary from embodiment to embodiment but will typically include at least a credit mechanism 52 to enable a player to input credits and to receive payouts, at least one display 54, a game play mechanism 56 including one or more input devices that enable a player to input game play instructions (e.g. to place a wager), and one or more speakers 58.

Game controller 60 is in data communication with player interface 50 and typically includes a processor 62 that processes the game play instructions in accordance with game play rules and outputs game play outcomes to display 54. Typically, the game play rules are stored as program code in a memory 64 but can also be hardwired. As used herein, the term “processor” refers generically to any device that can process game play instructions in accordance with game play rules and may include, for example, a microprocessor, microcontroller, programmable logic device or other computational device, a general purpose computer (e.g. a PC) or a server. That is, a processor 62 may be provided by any suitable logic circuitry for receiving inputs, processing them in accordance with instructions stored in memory 64 and generating outputs (for example on display 54). Such processors are sometimes also referred to as central processing units (CPUs). Most processors are general purpose units, however, it is also know to provide a specific purpose processor using an application specific integrated circuit (ASIC) or a field programmable gate array (FPGA).

FIG. 2 illustrates a gaming system 75 in the form of an exemplary standalone gaming machine 10. In the exemplary embodiment, gaming machine 10 includes a console 12 having a display 14 on which are displayed representations of a game 16 that can be played by a player. A mid-trim 20 of gaming machine 10 houses a bank of buttons 22 for enabling a player to interact with gaming machine 10, in particular during game play. Mid-trim 20 also houses a credit input mechanism 24. In the exemplary embodiment, credit input mechanism 24 includes a coin input chute 24A and a bill collector 24B. Other credit input mechanisms may also be employed, such as, for example, a card reader for reading a smart card, debit card, and/or credit card. Other gaming machines may be configured for ticket use, in that these gaming machines include a ticket reader for reading tickets having a value and for crediting the player based on the face value of the ticket. A player marketing module (not shown) having a reading device may also be provided for the purpose of reading a player tracking device, for example, as part of a loyalty program. The player tracking device may be in the form of a card, flash drive, or any other portable storage medium capable of being read by the reading device. In some embodiments, the player marketing module may provide an additional credit mechanism, either by transferring credits to the gaming machine from credits stored on the player tracking device or by transferring credits from a player account in data communication with the player marketing module.

A top box 26 may carry artwork 28, including, for example, pay tables and details of bonus awards and other information or images relating to the game. Further artwork and/or information may be provided on a front panel 29 of console 12. In the exemplary embodiment, a payout mechanism such as a coin tray 30 is mounted beneath front panel 29 for dispensing cash payouts from gaming machine 10.

In the exemplary embodiment, display 14 is a video display unit, particularly a cathode ray tube screen device. Alternatively, display 14 may be a liquid crystal display, plasma screen, any other suitable video display unit, or the visible portion of an electromechanical device. Top box 26 may also include a display, such as, for example, a video display unit, which may be of the same type as display 14, or of a different type.

FIG. 3 illustrates a block diagram of exemplary functional components of a typical gaming machine 100, which may be the same as or different to gaming machine 10 (shown in FIG. 2).

Gaming machine 100 includes a game controller 101 including a processor 102 mounted on a circuit board. Instructions and data to control operation of processor 102 are stored in a memory 103 that is in data communication with processor 102. Typically, gaming machine 100 will include both volatile and non-volatile memory and more than one of each type of memory, with such memories being collectively represented by memory 103.

Gaming machine 100 includes hardware meters 104 for purposes including ensuring regulatory compliance and monitoring player credit, an input/output (I/O) interface 105 for communicating with peripheral devices of gaming machine 100. I/O interface 105 and/or the peripheral devices may be intelligent devices with their own memory for storing associated instructions and data for use with the input/output interface or the peripheral devices. A random number generator module 113 generates random numbers for use by processor 102. Persons skilled in the art will appreciate that the reference to random numbers includes pseudo-random numbers.

In the exemplary embodiment, a player interface 120 includes peripheral devices that communicate with game controller 101 including one or more displays 106, a touch screen and/or input buttons 107 (which provide a game play mechanism), and a credit input mechanism such as a card and/or ticket reader 108, a bill acceptor 110, and/or coin input mechanism 110. The credit input mechanism is configured to receive a credit wager to initiate play of a base game, and establish a credit balance (e.g., using the received credit wager) that is increasable and decreasable based on wagering activity within a game. Player interface 120 also includes a payout mechanism such as a printer 109 and/or a coin output mechanism 111. The payout mechanism is configured to output a payout to a player of gaming machine 100 based on an outcome of the game (e.g., a base game and/or a feature game). Additional hardware may be included as part of gaming machine 100, or hardware may be omitted as required for the specific implementation. For example, although buttons or touch screens are typically used in gaming machines to allow a player to place a wager and to initiate a play of a game, any input device that enables the player to input game play instructions may be used. For example, in some gaming machines, a mechanical handle may be used to initiate a play of the game. Persons skilled in the art will also appreciate that a touch screen can be used to emulate other input devices, such as, for example, a touch screen can display virtual buttons that a player can "press" by touching the screen where they are displayed.

In addition, gaming machine 100 may include a communications interface, for example, a network card 112. Network card 112 may, for example, send status information, accounting information, or other information to a bonus controller, central controller, server, or database and receive data or commands from the bonus controller, central controller, server, or database. In embodiments employing a player marketing module, communications over a network may be via player marketing module—i.e., the player marketing module may be in data communication with one or more of the above devices and communicate with it on behalf of gaming machine 100.

FIG. 4 is a block diagram of the main components 103A, 103B, 103C of a memory 103. In the exemplary embodiment, memory 103 includes RAM 103A, EPROM 103B, and a mass storage device 103C. RAM 103A typically temporarily holds program files for execution by processor 102 and related data. EPROM 103B may be a boot ROM device and/or may contain some system- or game-related code. Mass storage device 103C is typically used to store game programs, the integrity of which may be verified and/or authenticated by processor 102 using protected code from EPROM 103B or elsewhere.

It is also possible for the operative components of gaming machine 100 to be distributed. For example, in one embodiment, input/output devices 106,107,108,109,110,111 are provided remotely from game controller 101.

FIG. 5 illustrates an exemplary gaming system 200 in accordance with an alternative embodiment. Gaming system 200 includes a network 201, which, for example, may be an Ethernet network. In the exemplary embodiment, gaming machines 202, shown arranged in three banks 203 of two gaming machines 202, are coupled to network 201. Gaming machines 202 provide a player-operable interface and may be the same as gaming machines 10 and/or 100 (shown respectively in FIGS. 2 and 3), or may have simplified functionality depending on the requirements for implementing game play. Although banks 203 of two gaming machines 202 are shown in the exemplary embodiment, banks of one, three, or more gaming machines 202 are also envisioned.

One or more displays 204 may also be coupled to network 201. For example, displays 204 may be associated with one or more banks 203 of gaming machines 202. Displays 204 may be used to display representations associated with game play on gaming machines 202, and/or used to display other representations, for example, promotional or informational material.

In a thick client embodiment, a game server 205 implements part of the game played by a player using a gaming machine 202, and gaming machine 202 implements part of the game. With this embodiment, as both game server 205 and gaming machine 202 implement part of the game, they collectively provide a game controller. A database management server 206 may manage storage of game programs and associated data for downloading or access by gaming machines 202 in a database 206A. Typically, if gaming system 200 enables players to participate in a Jackpot game, a Jackpot server 207 will be provided to perform accounting functions for the Jackpot game. A loyalty program server 212 may also be provided.

In a thin client embodiment, game server 205 implements most or all of the game played by a player using a gaming machine 202, and gaming machine 202 essentially provides only the player interface. In such an embodiment, game server 205 provides the game controller, and gaming machine 202 receives player instructions and transmits these instructions to game server 205. Game server 205 processes the player instructions and returns game play outcomes to gaming machine 202 for display. In a thin client embodiment, such gaming machines 202 could be computer terminals, e.g., PCs running software that provides a player interface operable using standard computer input and output components. Other client/server configurations are possible, and further details of a client/server architecture can be found in WO 2006/052213 and PCT/SE2006/000559, the disclosures of which are incorporated herein by reference.

Servers are also typically provided to assist in the administration of gaming system 200, including, for example, a gaming floor management server 208 and a licensing server 209 to monitor the use of licenses relating to particular games. An administrator terminal 210 is provided to allow an administrator to run network 201 and the devices connected to network 201.

Gaming system 200 may communicate with other gaming systems, other local networks (for example, a corporate network), and/or a wide area network such as the Internet, for example, through a firewall 211.

Persons skilled in the art will appreciate that in accordance with known techniques, functionality at the server side of network 201 may be distributed over a plurality of different computers. For example, elements may be run as a single "engine" on one server or a separate server may be provided. For example, game server 205 could run a random generator engine. Alternatively, a separate random number generator server could be provided. Further, persons skilled in the art will appreciate that a plurality of game servers could be provided to run different games or a single game server may run a plurality of different games as required by the terminals.

Further Details of the Exemplary Gaming System

In one embodiment, a gaming system is configured to provide a spinning reel game of chance in which a feature game can be triggered. When the feature game is triggered, a plurality of free games are awarded. Each free game includes an initial game round and at least one subsequent game round. Candidate game outcomes are generated for at least the initial game round, as described in more detail below.

In order to initiate a play of the gaming system, the player operates game play mechanism 56 to specify a wager that affects the win entitlement that will be evaluated for this play of the game, and the player initiates a play of the game. Hence, a player's win entitlement can vary from game to game, depending on player selections. In most spinning reel games, it is typical for the player's entitlement to be affected by the amount they wager and by selections they make (i.e., the nature of the wager). For example, a player's win entitlement may be based on how many lines they play in each game—e.g., a minimum of one line up to a maximum number of lines permitted by the game (noting that not all permutations of win lines may be available for selection)—and how much they wager per line. Such win lines are typically defined by a combination of symbol display positions, one from each reel. The symbol display positions are located relative to one another such that they form a line that extends across the reels.

In many games, the player's win entitlement is not strictly limited to the lines they have selected. For example, "scatter" pays may be awarded independently of a player's selection of pay lines, and may be an inherent part of the win entitlement.

In other embodiments, the player may obtain a win entitlement by selecting a number of reels to play and an amount to wager per reel. Such games may be marketed under the trade name "Reel Power" by Aristocrat Leisure Industries Pty Ltd. The selection of a reel means that each displayed symbol of the reel can be substituted for another symbol at one or more designated display positions. In other words, all symbols displayed at symbol display positions corresponding to a selected reel can be used to form symbol combinations with other symbols displayed at designated symbol display positions on the other reels. For example, if there are five reels and three symbol display positions for each reel, such that the symbol display positions comprise three rows of five symbol display positions, the symbols displayed in the center row may be used for non-selected reels. As a result, the total number of ways to win is determined by multiplying the number of active display positions of each reel (the active display positions being all display positions of each selected reel) and the designated display position of the non-selected reels. As a result, for five reels and fifteen display positions, there are 243 possible ways to win.

FIG. 6 illustrates another block diagram of an exemplary gaming system. In the exemplary embodiment, processor 62 of game controller 60 is shown implementing a number of modules based on program code and data stored in memory 64. In other embodiments, the modules could be implemented in some other way, for example, by a dedicated circuit.

These modules implement functionality that enables the game controller to implement the game. An outcome generator 622 operates in response to the player's operation of game play mechanism 56 to place a wager and to initiate a play of the game. Outcome generator 622 generates a game outcome that is evaluated by an outcome evaluator 624. In an embodiment, a symbol selector 622A of outcome generator 622 selects symbols from base reels 641A of symbol data 641, using a random number generator 621. The selected symbols are transmitted to a display controller 625, which causes the selected symbols to be displayed on display 54 at a corresponding set of display positions.

In one embodiment, symbol selector 622A selects symbols for display from a plurality of symbol sets corresponding to respective reels of a plurality of spinning reels. Base reels 641A specify a sequence of symbols for each reel, such that symbol selector 622A may select symbols by randomly selecting a stopping position in the sequence. In one example, three symbols of each of five reels may be displayed such that the symbols are displayed at fifteen corresponding display positions on display 54. In another embodiment, a probability table stored in memory 64 is used to vary the odds of a particular stop position in the sequence being selected. Other techniques may be used to control the odds of particular outcomes occurring to thereby control the return to player of the game.

Outcome evaluator 624 compares and evaluates the selected symbols against a pay table 644 based on the wager placed by the player in order to determine whether to make one or more awards. Any awards are made by a prize awarder 624A by increasing or updating meters 645 and are also displayed on display 54 via display controller 625. Outcome evaluator 624 also includes a trigger monitor 624B that monitors the symbols selected by symbol selector 622A to determine whether a trigger condition is satisfied. In one example, to satisfy the trigger condition, a defined number of scatter symbols must be selected by symbol selector 622A. If the trigger condition is not satisfied, the play of the game ends (assuming the player does not exercise a gamble option, such as a "double-or-nothing" gamble option).

If the trigger condition is satisfied, a feature game is triggered. The feature game includes a number of free games that are awarded by outcome evaluator 624 and carried out by gaming system 75. In one embodiment, the number of free games depends on the number of scatter symbols that are selected by symbol selector 622A. In one embodiment, each free game includes at least two game rounds.

In an initial game round, an initial game outcome is selected by game outcome generator 622, as described further herein. The initial game outcome is displayed on display 54 under the control of display controller 625. The player is then presented with an option to "keep" or "hold" none, part, or all of the initial game outcome. Holding part of the initial game outcome includes, for example, holding one or more reels that will not be re-spun in a subsequent game round. The player's selections and instructions to hold any part(s) of the initial game outcome are processed by and stored in a reel holder 622B, and may be further stored in memory 64. Any part(s) of the initial game outcome that are not held by the player are reselected by game outcome generator 622.

In one embodiment, for each initial game round of each free game, symbol selector 622A generates a plurality of candidate game outcomes. Each candidate game outcome is selected by symbol selector 622A from feature reels 641B. These candidate game outcomes are stored in memory 64 as candidate data 642. A candidate outcome assessor 623 assesses each candidate outcome based on assessment data 643, which enables the candidate outcome assessor 623 to assess which candidate game outcome would provide the greatest benefit when generating a subsequent game round in the free game. In one embodiment, as described in further detail below, assessment data 643 includes criteria for assessing each candidate game outcome to determine the "greatest benefit." The criteria specifies that the candidate game outcome that provides the "greatest benefit" is the candidate game outcome with the highest optimal expected win amount. In another embodiment, the criteria may identify a "greatest benefit" to the player in terms of interest to the player. For example, in such an embodiment, candidate outcome assessor 623 may assess the candidate game outcomes to determine which candidate game outcome would provide the most wins or the highest individual win amount.

In one embodiment, candidate outcome assessor 623 calculates the result of every combination of holding reels for each candidate game outcome, identifies the hold combination for each respective candidate game outcome that results in the highest average return to the player, and compares the highest average return across all candidate game outcomes to find the overall "best" candidate game outcome (e.g., the candidate game outcome associated with the overall highest average return).

For example, in one embodiment, three candidate game outcomes are assumed to be generated. For each candidate game outcome, if there are 5 reels, there are 32 different hold patterns, or ways to hold the reels (5 reels, either held or unheld; 2^5=32). For each of the 32 different hold patterns, the candidate outcome assessor 623 determines the expected win amount from that particular hold pattern.

The "optimal hold pattern" will be the hold pattern with the highest expected win amount. Candidate outcome assessor 623 then compares the expected win amounts of the respective optimal hold pattern of each candidate game outcome. Candidate outcome assessor 623 selects the candidate game outcome that is expected to deliver the greatest benefit (e.g., the candidate game outcome with an optimal hold pattern with the overall highest expected win amount) and causes display controller 625 to display the selected candidate game outcome.

The selected symbols of the plurality of reels are displayed by display controller 625 on display 54 together with a message instructing to the player to touch reels to select which reels the player wishes to be held. In one embodiment, an indicator provided on the display enables the player to determine whether they have made an "optimal" selection. In one embodiment, the player can choose not to hold any reels or can choose to hold all reels. In one embodiment, gaming system 75 prevents the player from making invalid selections, such as a selection that would automatically result in a loss. To make a selection of reels to hold, the player uses game play mechanism 56, for example, by touching one of the reels on a touchscreen of game play mechanism 56. The selected reels are held by reel holder 622B of game outcome generator 622. Symbol selector 622A then selects symbols for the remaining, un-held reels from feature reels 641B in the same manner described above. These selected symbols are then displayed on display 54 in conjunction with the held symbols of the held reels. All of the displayed symbols are evaluated by outcome evaluator 624.

In some embodiments, the player may then be provided with a further option to hold the same reels that the player already selected to hold. In one example, where gaming system 75 determines that the player makes "sub-optimal" decisions with respect to selecting which reels to hold, the player is provided with an increased chance of being awarded one or more additional re-spin rounds. For example, a calculation is performed by a player selection monitor 626 using an optimal hold determiner 626A that determines whether the player has made the optimal hold by selecting an optimal hold pattern.

In such an embodiment, after determining that the player has made a sub-optimal selection, player selection monitor 626 determines whether to award one or more re-spin game rounds in order to preserve an appropriate return to player. For example, the chances of player selection monitor 626 awarding a re-spin round may be derived from a calculation as to the return to player "lost" by the player's sub-optimal selection. After determining to award an additional re-spin round, player selection monitor 626 causes a message to be output to the player to make an additional selection of reels, and game outcome generator 622 generates an additional re-spin round, after the player made their selection of which reels to hold.

For each re-spin, a corresponding subsequent game outcome is evaluated by outcome evaluator 624 based on pay table 644. Prize awarder 624A determines whether to award any prize by adding a win to meters 645. In such an embodiment, the game then proceeds to the next free game. Each free game involves an additional cycle of game rounds, including an initial game round, in which candidate game outcomes are generated by the game outcome generator 622 and are assessed by candidate outcome assessor 623, and then a subsequent, "re-spin" game round in which one or more reels are re-spun based on the selection by the player.

FIG. 7 is a flow chart of an exemplary method 700 of electronic gaming. In the exemplary embodiment, method 700 includes conducting 705 a base game, and determining 710 whether a trigger is satisfied. After a trigger is not satisfied, then an additional base game will be conducted assuming the player places an additional wager. Method 700 includes generating 715 candidate game outcomes, assessing 720 the game outcomes, selecting 725 and displaying a game outcome, and receiving 730 a hold selection from a player. Method 700 then involves determining 745 whether the hold is optimal and if it is not optimal, the player selection monitor 626 determines 710 whether to compensate 750 a player for the sub-optimal selection by an awarding the player an additional re-spin. The subsequent game outcome is generated 755 based on the hold selection and is evaluated 760 to determine whether to award any prizes based on pay table. The process then reverts to generating 715 candidate game outcomes until each of the free games are exhausted.

Further aspects of the method will be apparent from the above description of the system. It will be appreciated that at least part of the method will be implemented electronically, for example, digitally by a processor executing program code such as in the above description of a game controller. In this respect, in the above description certain steps are described as being carried out by a processor of a gaming system, it will be appreciated that such steps will often require a number of sub-steps to be carried out for the steps to be implemented electronically, for example due to hardware or programming limitations. For example, to carry out a step such as evaluating, determining or selecting, a processor may need to compute several values and compare those values.

As indicated above, the method may be embodied in program code. The program code could be supplied in a number of ways, for example on a tangible computer readable storage medium, such as a disc or a memory device, e.g. an EEPROM, (for example, that could replace part of memory 103) or as a data signal (for example, by transmitting it from a server). Further different parts of the program code can be executed by different devices, for example in a client server relationship. Persons skilled in the art, will appreciate that program code provides a series of instructions executable by the processor.

In some embodiments, an eligibility criteria may be applied for the player to be eligible for the re-spin feature game, for example, that the player has made a wager of a certain size, made an ante bet, selected all win lines, or played sufficient games, or the player is a member of a loyalty program.

As indicated above, the trigger condition may be satisfied by an occurrence of a symbol combination in the game; however, other trigger conditions could be used, for example, occurrence of a specific symbol in the game, purchase of a trigger, or a trigger may be caused by another connected system, based on turnover, based on a random evaluation, etc.

Typically, a win will result in some form of award being made, such as an award of credits. Such an award may never actually be physically received by a player. For example, many gaming systems provide a player with a "double or nothing" gamble feature, where the player can double or forfeit their credits before commencing another play of the game or cashing out. Further, as credits are fungible, once credits have been added to the credit meter, it is not possible to distinguish between credits that the player has input as cash or the like and credits resulting from an award.

EXAMPLES

In a first example, the method of determining a symbol to occupy the group of dynamically determined symbol positions (i.e. the stack of symbols) without using a weighting table to generate a random number of between 1 and the length of the subset of symbol positions of the reel strip that have symbols fixedly associated with them. That is, the random number generated is the actual position of a symbol on that reel strip. In the first example, it is the symbol at that position that the mystery symbols or stack becomes.

Table 1 shows the original reel strip comprising fixed symbol positions 1 to 20 and dynamic symbol positions 21 to 30 as denoted by the "Mystery" symbols. Before a spin employing the dynamic reel strips, the game controller 60 causes the RNG 621 to generate a number between 1 and 20. In this example, the number is 8. Position 8 corresponds the symbol "A". Therefore, the reel strip is updated so that the mystery symbols from position 21 to 30 becomes "A" as shown in Table 2.

TABLE 2

| Position | Reel 1 |
|---|---|
| 1 | A |
| 2 | K |
| 3 | Q |
| 4 | 10 |
| 5 | Pic 1 |
| 6 | J |
| 7 | Q |
| 8 | A |
| 9 | 10 |
| 10 | K |
| 11 | Q |
| 12 | 10 |
| 13 | Pic 1 |
| 14 | J |
| 15 | Q |
| 16 | A |
| 17 | Pic2 |
| 18 | 9 |
| 19 | 10 |
| 20 | Q |
| 21 | A |
| 22 | A |
| 23 | A |
| 24 | A |
| 25 | A |
| 26 | A |
| 27 | A |
| 28 | A |
| 29 | A |
| 30 | A |

TABLE 1

| Position | Reel 1 |
|---|---|
| 1 | A |
| 2 | K |
| 3 | Q |
| 4 | 10 |
| 5 | Pic 1 |
| 6 | J |
| 7 | Q |
| 8 | A |
| 9 | 10 |
| 10 | K |
| 11 | Q |
| 12 | 10 |
| 13 | Pic 1 |
| 14 | J |
| 15 | Q |
| 16 | A |
| 17 | Pic2 |
| 18 | 9 |
| 19 | 10 |
| 20 | Q |
| 21 | MYSTERY |
| 22 | MYSTERY |
| 23 | MYSTERY |
| 24 | MYSTERY |
| 25 | MYSTERY |
| 26 | MYSTERY |
| 27 | MYSTERY |
| 28 | MYSTERY |
| 29 | MYSTERY |
| 30 | MYSTERY |

In a second example, there is not a direct correlation between all of the selected positions and the symbol that will be displayed. In one embodiment, selection of some of the symbol positions will result in that symbol being displayed while selection of other symbol positions will result in a default symbol being displayed. For example, if RNG 621 choses position 1, 8 or 16, from Table 1, the MYSTERY symbol is "A", otherwise MYSTERY becomes a SPECIAL SYMBOL not currently on the reel strip.

In a third example, a weighting can be assigned to some or all of the positions on the reel strip. In one example, shown in Table 3, weightings are associated with specific positions. If the reel position has a weighting, the mystery symbol will become that symbol based on the weighting, otherwise it stays a mystery symbol. Note a weighting of zero means the mystery symbol remains a mystery symbol. That is, there is a multiple stage process, first select a position and second determine based on a random trial derived from the weighting whether the mystery symbol will become a particular symbol.

In another example, weightings could be associated with specific reel strip positions in order to vary the odds of particular reel strip positions being selected by RNG 621.

| Reel 1 position | Weighting | MYSTERY becomes |
|---|---|---|
| 1 | 0.2 | A |
| 2 | 0.1 | K |
| 3 | 0.1 | Q |
| 4 | 0.1 | 10 |
| 5 | 0.1 | Pic 1 |
| 6 | 0.1 | J |
| 7 | 0.1 | Q |
| 8 | 0.2 | A |
| 9 | 0 | 10 |
| 10 | 0 | K |
| 11 | 0 | Q |
| 12 | 0 | 10 |
| 13 | 0 | Pic 1 |
| 14 | 0 | J |
| 15 | 0 | Q |
| 16 | 0 | A |
| 17 | 0 | Pic2 |
| 18 | 0 | 9 |
| 19 | 0 | 10 |
| 20 | 0 | Q |
| | 1 | |

Further aspects of the method will be apparent from the above description of the system. It will be appreciated that at least part of the method will be implemented electronically, for example, digitally by a processor executing program code such as in the above description of a game controller. In this respect, in the above description certain steps are described as being carried out by a processor of a gaming system, it may be appreciated that such steps may often require a number of sub-steps to be carried out for the steps to be implemented electronically, for example due to hardware or programming limitations. For example, to carry out a step such as evaluating, determining or selecting, a processor may need to compute several values and compare those values.

As indicated above, the method may be embodied in program code. The program code could be supplied in a number of ways, for example on a tangible computer readable storage medium, such as a disc or a memory device, e.g. an EEPROM, (for example, that could replace part of memory 103) or as a data signal (for example, by transmitting it from a server). Further different parts of the program code can be executed by different devices, for example in a client server relationship. Persons skilled in the art, will appreciate that program code provides a series of instructions executable by the processor.

It is understood to persons skilled in the art of the disclosure that many modifications may be made without departing from the spirit and scope of the invention, in particular it will be apparent that certain features of embodiments of the invention can be employed to form further embodiments.

It is to be understood that, if any prior art is referred to herein, such reference does not constitute an admission that the prior art forms a part of the common general knowledge in the art in any country.

In the claims that follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

What is claimed is:

1. A method comprising:

storing a dynamic reel strip having a plurality of reel strip positions including a plurality of fixed symbol positions and at least one dynamically determined symbol position configured to display a dynamically selected symbol;

using a reel updater comprising a random number generator for randomly selecting a first fixed symbol position from the plurality of fixed symbol positions on the dynamic reel strip;

determining, using a symbol determiner that uses weightings associated with at least a subset of the fixed symbol positions, during play the dynamically selected symbol to be displayed on the at least one dynamically determined symbol position based on the weightings, wherein the dynamically selected symbol is a symbol occurring on the dynamic reel strip in the selected first fixed symbol position; and displaying the dynamically selected symbol on the at least one dynamically determined symbol position.

2. The method of claim 1 further comprising populating the at least one dynamically determined symbol position with the dynamically selected symbol.

3. The method of claim 2 further comprising:

generating a game outcome associated with the dynamic reel strip after the at least one dynamically determined symbol position is populated with the dynamically selected symbol;

evaluating the game outcome to determine one or more awards; and adding the one or more awards to a win meter.

4. The method of claim 1 further comprising storing a plurality of dynamic reel strips each comprising at least one dynamically determined symbol position and a plurality of fixed symbol positions.

5. The method of claim 4 further comprising for each of the plurality of dynamic reel strips, independently determining the dynamically selected symbol to be displayed on the at least one dynamically determined symbol position.

6. The method of claim 4 further comprising populating each of the dynamically determined symbol positions of the plurality of dynamic reels strips with the dynamically selected symbol.

7. The method of claim 1, wherein the method is implemented via an electronic gaming system comprising a display, a player input interface, and a game controller, wherein the method further comprises initiating play of a wagering game.

8. The method of claim 1, further comprising:

determining whether the first fixed symbol position is associated with a weighting; and one of:

if the first fixed symbol position is associated with the weighting, displaying the dynamically selected symbol in the at least one dynamically determined symbol position, or if the first fixed symbol position is not associated with the weighting, displaying a mystery symbol in the at least one dynamically determined symbol position.

9. An electronic game controller configured to execute instructions stored on a memory, which, when executed by the electronic game controller, cause the electronic game controller to at least:

access the memory to retrieve a dynamic reel strip having a plurality of reel strip positions including a plurality of fixed symbol positions and at least one dynamically determined symbol position configured to display a dynamically selected symbol;

control a reel updater comprising a random number generator to randomly select a first fixed symbol position from the plurality of fixed symbol positions on the dynamic reel strip;

control a symbol determiner that uses weightings associated with at least a subset of the fixed symbol positions to determine during play the dynamically selected symbol to be displayed on the at least one dynamically determined symbol position based on the weightings, wherein the dynamically selected symbol is a symbol occurring on the dynamic reel strip in the selected first fixed symbol position; and display the dynamically selected symbol on the at least one dynamically determined symbol position.

10. The electronic game controller of claim 9, wherein the instructions further cause the game controller to populate the at least one dynamically determined symbol position with the dynamically selected symbol.

11. The electronic game controller of claim 9, wherein the instructions further cause the game controller to:

generate a game outcome associated with the dynamic reel strip after the at least one dynamically determined symbol position is populated with the dynamically selected symbol;

evaluate the game outcome to determine one or more awards; and add the one or more awards to a win meter.

12. A method comprising:

storing a dynamic reel strip having a plurality of reel strip positions including a plurality of fixed symbol positions and a plurality of determined symbol positions configured to display a selected symbol;

using a reel updater comprising a random number generator for randomly selecting a first fixed symbol position from the plurality of fixed symbol positions;

using a symbol determiner that uses weightings associated with at least a subset of the fixed symbol positions for determining, during play, the selected symbol to be displayed on a subset of the plurality of determined symbol positions based on the weightings, wherein the selected symbol is a symbol occurring on the dynamic reel strip in the randomly selected first fixed symbol position of the plurality of fixed symbol positions;

displaying the selected symbol on the subset of the plurality of determined symbol positions; and displaying a default symbol on the remainder of the plurality of determined symbol positions.

13. The method of claim 12 further comprising storing a plurality of reel strips each comprising a plurality of determined symbol positions and a plurality of fixed symbol positions.

14. The method of claim 13 further comprising for each of the plurality of reel strips, independently selecting a symbol from the corresponding plurality of fixed symbol positions.

15. The method of claim 13 further comprising populating each of the subset of the plurality of determined symbol positions of the plurality of reels strips with the selected symbol.

16. The method of claim 12 further comprising populating each of the subset of plurality of determined symbol positions with the selected symbol.

17. The method of claim 16 further comprising:

generating a game outcome associated with the reel strip after the subset of the plurality of determined symbol positions are populated with the selected symbol;

evaluating the game outcome to determine one or more awards; and adding the one or more awards to a win meter.

18. The method of claim 12 wherein weightings are associated with each of the plurality of the fixed symbol positions, and wherein the fixed symbol position of the plurality of fixed symbol positions is selected based on the weightings.

19. The method of claim 18 further comprising:

selecting a second fixed symbol position from the plurality of the fixed symbol positions;

determining, based on the weightings, a second symbol to be displayed on each of a second subset of the plurality of determined symbol positions, wherein the selected symbol corresponds to and matches a symbol displayed on the selected second fixed symbol position; and displaying the second symbol on the second subset of the plurality of determined symbol positions.

20. The method of claim 12 further comprising selecting a second symbol from a second fixed symbol position from the plurality of fixed symbol positions to be the default symbol.

* * * * *